March 7, 1950     K. H. BLOMBERG     2,499,451
CONTROLLING APPARATUS

Original Filed Oct. 21, 1942     2 Sheets-Sheet 1

INVENTOR.
K. H. Blomberg

March 7, 1950 K. H. BLOMBERG 2,499,451
CONTROLLING APPARATUS

Original Filed Oct. 21, 1942 2 Sheets-Sheet 2

INVENTOR.
K. H. Blomberg
BY
Attorneys.

Patented Mar. 7, 1950

2,499,451

UNITED STATES PATENT OFFICE 2,499,451

CONTROLLING APPARATUS

Knut Hugo Blomberg, New York, N. Y., assignor to Telefonaktiebolaget L. M. Ericsson, Stockholm, Sweden Original application October 21, 1942, Serial No. 462,868. Divided and this application April 16, 1946, Serial No. 662,439. In Sweden October 21, 1941

6 Claims. (Cl. 200—56)

The present invention relates to an automatic electric arrangement for control of a circuit in dependence upon the position of a pointer in a measuring instrument. Such arrangements are used among other things for the control of the temperature in electric furnaces. The object of the invention is to produce a controlling apparatus of such a type that is simple and cheap and in which the pointer of the measuring instrument is not exposed to mechanical stresses.

This application is a division of my earlier application filed October 21, 1942, Serial Number 462,868, now U. S. Patent 2,435,027, issued January 27, 1948.

Figure 1:
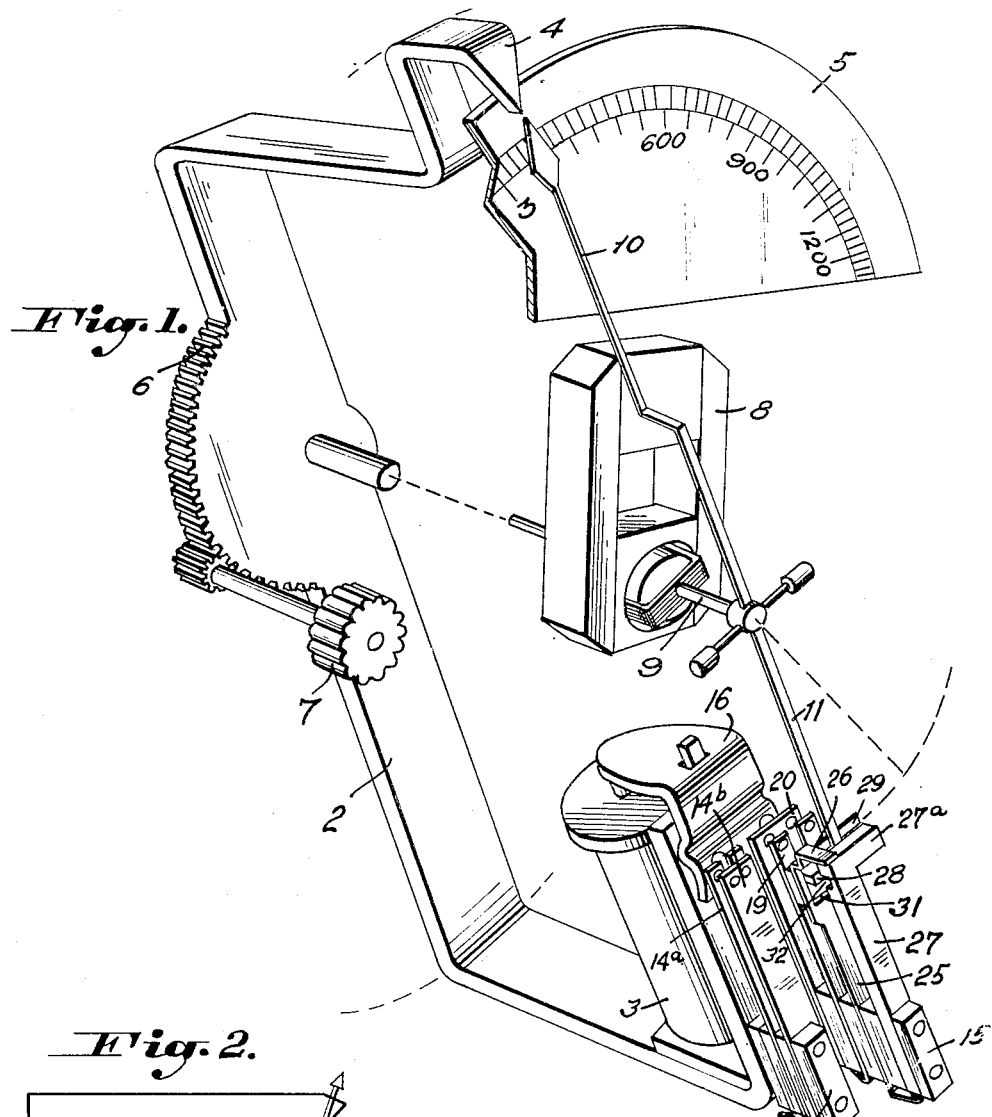
Figure 2:
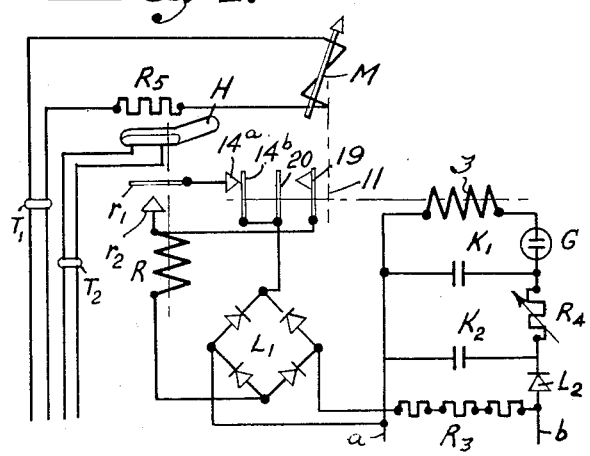
Figure 3:
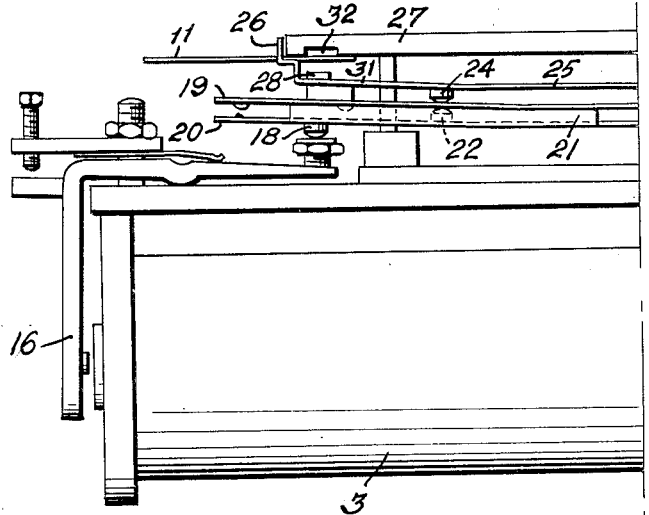
Figure 4:
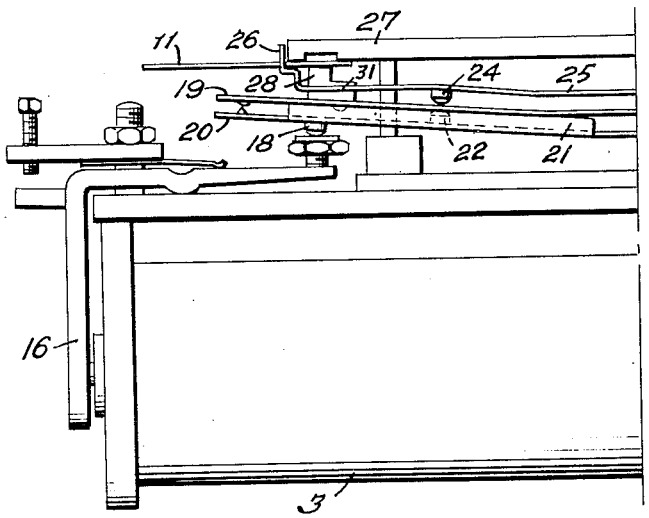

The invention will be more closely described with reference to the accompanying drawings in which Fig. 1 is a perspective view of a device according to the invention, Fig. 2 is a circuit diagram, Figs. 3 and 4 show the contact spring assembly with the springs in different positions.

On a pivot 1 is placed a U-shaped arm 2 which at the one end supports a relay 3 and at the other is formed as a pointer 4 that is movable over a scale 5. The arm 2 is adjustable in different positions by turning round the pivot 1 which turning is produced by the wheel 7 actuating a toothed gear segment 6. The measuring instrument 8 is arranged in such a way that the axis of the driving axle 9 of the pointer 10 coincides with the axis of the pivot 1. The pointer axle supports the pointer 10, the prolongation 11 of which cooperates with one 15 of the two spring assemblies 14 and 15 of the relay 3. The contacts 14a and 14b of the spring assembly 14 are closed when the relay is in its rest position but are opened when the armature 16 of the relay is attracted by a stud on the armature lifting spring 14b. The spring assembly 15, the construction of which appears from the Figs. 1, 3 and 4, comprises two contact springs 19 and 20. The latter is furnished with a reinforcement 21 and studs 18 and 22. The spring 19 is provided with a stud 28. Above the contact is arranged a stationary bridge 27 provided with a track 32 adapted, at times, to receive the stud 28. When the armature 16 is attracted and presses the stud 18, the springs 20 and 19 are lifted, the latter by means of the stud 22. A closing of the contact between these springs can not occur if the movement upwards of the spring 19 is not limited. This closing is however affected in the position shown in Figs. 3 and 4 when the pointer prolongation 11 takes such a position that it lies across and obstructs the track 32. When the two springs 19 and 20 are then lifted, the stud 28 of the spring 19 cannot penetrate into the track 32. The movement upwards of the spring 19 will therefore be stopped as soon as the stud 28 engages the prolongation 11. During the continued movement of the armature only the spring 20 will be lifted upwards and in so doing it makes contact with the spring 19, as shown in Fig. 4. If the prolongation 11 assumes a position laterally of the spring assembly as shown in Fig. 1 with dotted lines the track 32 will be open and the stud 28 will push into the track when the springs are being lifted. The two springs will then be lifted parallel to each other during the whole movement of the armature and there will be no contact between them. In order to prevent the stud 28 from striking and pressing hard against the pointer if the pointer prolongation 11 is just in front of the track 32 there is a spring 25, Fig. 3, which is furnished with a stud 24. The spring is bent at its free end in such a way that a surface 29 facing the pointer prolongation is obtained. The spring is also furnished with a flap 26 for limiting the movements of the pointer in one direction, Fig. 1. An opening 31, Fig. 1, is arranged in the same spring 25 in such a way that the stud 28 is able to move freely therein. When the contact springs 19, 20, are being lifted at the movements of the armature the spring 25 will also be lifted upwards by the stud 22 and stud 24. The surface 29 then will make contact with the pointer prolongation 11. During the continued movement upwards of the armature the free end of the spring 25 will be bent adjacent the stud 24 in such a way that it bears yieldably against the prolongation 11, as is shown in Fig. 4 and presses the prolongation 11 elastically against the bridge 27 before the stud 28 strikes against the same.

Fig. 2 is a circuit diagram showing the invention applied to an arrangement controlling the temperature in a furnace. M is a measuring instrument. Both its terminals T1 are connected to a thermo couple in the furnace over the resistance R5. The mercury circuit breaker H is connected to a control circuit over the line T2, which circuit supervises the connection and disconnection of a heater in the furnace. This heater will be connected when the circuit breaker H takes the position shown in Fig. 2. The relay 3 is connected to the wires $a, b$, over the glow lamp G, the resistance R4 and the rectifier La. The wires $a, b$ are connected with an alternating current source. K1 and K2 are condensers. The relay 3 is energized periodically in known manner by means of the glow lamp G and the condenser K1, the intervals between two energizations being controlled through the resistance R4. A rectifier bridge L1 is connected to the wires a, b over the resistance R3, said bridge feeding a circuit of the slow release relay R. Every time the relay 3 is energized the contact between the springs 14a and 14b in the spring assembly 14 of the relay will be broken and the two springs 19 and 20 will be lifted. In dependence upon the position of the pointer prolongation 11, the contact between 19 and 20 then will either remain open or be closed. If the pointer 11 is just in front of 19 and 20, this implies that the right temperature in the furnace is obtained. At this temperature, which must not be exceeded, the contact 19, 20 will be closed at the next momentary attraction of the relay, whereby the slow release relay R is energized and closes a holding circuit, for itself over contacts r1, r2. After de-energization of the relay, said holding circuit is closed over the contact 14a, 14b. On attraction of the relay R the circuit breaker H will be operated whereby the above described heater in the furnace will be disconnected. The heater will continue to be disconnected for as long a time as the temperature is at the value, which corresponds to the position of the pointer 11 right in front of the springs 19, 20. In this position of the pointer the relay R is energized. The relay R will be energized also during the periodical energizations of the relay 3 as the contact 19, 20 at every energization of the relay 3 will be closed at the same time as the contact 14a, 14b will be broken. If the temperature falls and the pointer thus will take such a position that it cannot cooperate with the springs 19, 20, the contact 19, 20 will not be closed at the next energization of the relay 3. Said contact remains broken and at the same time also the contact 14a, 14b is being broken. The circuit of the relay R will, therefore, be broken and relay R de-energized whereby the contact r1, r2 will be broken and the circuit breaker H restored to its rest position in which the heater is again connected. The temperature increases thereby again to a value corresponding to the pointer 11 coming right in front of the springs 19, 20 whereby the heater will then be disconnected as above described. It is evident that the heater will be alternately connected and disconnected, the temperature through this arrangement being thus maintained at a constant value.

What I claim is:

1. An automatic electric control apparatus comprising a movable pointer, a contact spring assembly, settable means for supporting said assembly in adjusted positions along the path of movement of said pointer, said spring assembly including contact springs movable into two different relative positions to make and break contact with each other, a stud carried by one of the contact springs, an abutment member having a recess for accommodating said stud, said pointer being adapted in a predetermined position thereof, to obstruct said recess and prevent entry of the stud therein, and operating means effective to move the springs from one to the other of said two positions when said recess is obstructed by said pointer and the movement of the first mentioned contact spring is limited thereby, said operating means being ineffective to move the springs from said first to said second position when the recess is unobstructed by said pointer and the stud is free to enter said recess.

2. An automatic electric control apparatus as claimed in claim 1 wherein an additional spring is provided and actuated by one of said contact springs to yieldably bear on said pointer when the latter is in its obstructing position.

3. An apparatus as claimed in claim 1 wherein a stud is provided to normally retain the contact springs in spaced relation.

4. An apparatus as claimed in claim 1 wherein a stud is provided to normally retain the contact springs in spaced relation and a reinforcement carried by one of said contact springs.

5. An arrangement as claimed in claim 1 wherein said contact springs and operating means are constituted by an electro-magnetic relay supported upon said settable means.

6. An arrangement as claimed in claim 1, characterized by the provision of a further pointer carried by said settable means and movable along the path of movement of said first mentioned pointer.

KNUT HUGO BLOMBERG.

No references cited.